INVENTORS
Daniel F. Popielinski
Joseph A. Keller

ATTORNEY

United States Patent Office 3,506,465
Patented Apr. 14, 1970

3,506,465
METHOD OF FORMING MAGNESIUM OXYSULFATE
Daniel F. Popielinski, Orchard Park, and Joseph A. Keller, Williamsville, N.Y., assignors to National Gypsum Company, Buffalo, N.Y., a corporation of Delaware
Filed Jan. 19, 1967, Ser. No. 610,258
Int. Cl. C04b 9/04
U.S. Cl. 106—105                                7 Claims

ABSTRACT OF THE DISCLOSURE

A method of forming magnesium oxysulfate by subjecting sulfated magnesium hydroxide to steam vapors. Magnesium oxide is mixed with a dilute aqueous solution of magnesium sulfate to form sulfated magnesium hydroxide, and this product exposed to steam, at either atmospheric or superatmospheric pressures, to form magnesium oxysulfate. The oxysulfate thus formed is suitable for use as a cementitious binder in a number of products.

---

This invention relates to magnesium oxysulfate. More particularly, it relates to a method of forming magnesium oxysulfate of the $5Mg(OH)_2$—$MgSO_4$—$3H_2O$ form by subjecting sulfated magnesium hydroxide to steam vapors.

Magnesium oxide cements have been known and used for many years as binders in a number of commercial products such as fibrous insulation, structural boards, and the like. Such cements are generally formed by the exothermic reaction of magnesium oxide with a dilute aqueous solution of magnesium sulfate (epsom salts), and are commonly known as "magnesium oxysulfate cement." However, the term "magnesium oxysulfate cement" for such binders a misnomer, for X-ray diffraction, infrared analysis, and electron microscopy have established that this cement is composed of a single phase aggregate of magnesium hydroxide crystals in which sulfate ions are present between the hydroxyl layers. Thus, the MgO reacts with small proportions of the $MgSO_4$ solution to form a phase which is $Mg(OH)_2$ but with some sulfate taken up between the layers of the structure. None of the magnesium oxysulfate forms identified in the literature are present in such magnesium cements. Thus, the reaction of magnesium oxide with a dilute solution of magnesium sulfate results in the formation of a cement which is a sulfated magnesium hydroxide and not magnesium oxysulfate.

The formation of magnesium oxysulfate has been reported in the literature. However, its formation is difficult and not precticable on a commercial scale. Consequently, this material has remained primarily a laboratory curiosity. One reported method of forming magnesium oxysulfate is by reacting MgO with an excess of concentrated $MgSO_4$ solution, under carefully controlled conditions of concentration, time and temperature. However, it has been found that in order to form the oxysulfate by this reaction, the magnesium oxide concentration must be maintained at low values, but that such mixtures low in MgO do not set and can not be used as a cement. In other words, in order to form a cement that will set by the reaction of MgO with a $MgSO_4$ solution, it is necessary that the MgO content be maintained at high values. But when the MgO is maintained at such high values, sulfated magnesium hydroxide and not magnesium oxysulfate is formed.

While the sulfated magnesium hydroxide cement formed by the reaction of MgO with a dilute aqueous solution of $MgSO_4$ is used in many commercial applications, it suffers from the disadvantage that it is sensitive to water, with the result that the cement deteriorates upon exposure to water. This makes the cement unsuitable for uses where good weathering properties are an important criterion. This deterioration of the cement upon exposure to water has been found to be due to the leaching or dissolving of sulfate ions from the magnesium hydroxide which drastically reduces the strength of the cement.

It is therefore an object of the present invention to provide a method of forming magnesium oxysulfate of the $5Mg(OH)_2$—$MgSO_4$—$3H_2O$ form.

Another object is to provide a method of forming magnesium oxysulfate cement having a reduced water-leachable sulfate ion content.

Various other objects and advantages will appear from the following description of the invention and the novel features will be particularly pointed out hereinafter in the claims.

Figure 1:
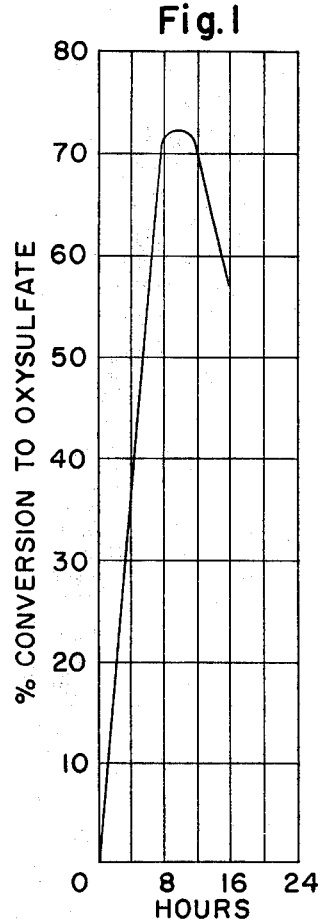
FIGURE 1 is a graph showing the percent of sulfated magnesium hydroxide converted to magnesium oxysulfate when exposed to steam under pressure according to the present invention.

It has been found that magnesium oxysulfate may be formed by subjecting sulfated magnesium hydroxide to steam vapors. Thus, sulfated magnesium hydroxide is first formed by mixing magnesium oxide with a dilute aqueous solution of magnesium sulfate (epsom salts) and this reaction product then subjected to steam vapors to convert the sulfated magnesium hydroxide to magnesium oxysulfate. The magnesium oxysulfate thus formed, which is primarily of the $5Mg(OH)_2$—$MgSO_4$—$3H_2O$ form, may be used as a cementitious binder in a number of commercial products such as fibrous insulation, structural boards, and the like. It is significantly stronger than sulfated magnesium hydroxide cement and is much less sensitive to water than such sulfated magnesium hydroxide cements, thereby making the cement of this invention well suited for applications where good weathering properties are required. Since the oxysulfate of this invention is made by first forming sulfated magnesium hydroxide and converting this reaction product to oxysulfate, this overcomes the problem encountered in the prior art in attempts to form magnesium oxysulfate cement, namely that mixtures sufficiently low in MgO content to form oxysulfate will not set and so can not be used as cement. Thus, the present invention provides a practical, commercially feasible method of forming magnesium oxysulfate from MgO and a solution of magnesium sulfate.

In the preparation of the oxysulfate cement of the present invention, a gauging solution is first prepared by adding $MgSO_4$—$7H_2O$ crystals to water. Magnesium oxide is then added to the gauging solution and thoroughly mixed to form a cementitious slurry, the magnesium oxide and sulfate reacting in an exothermic reaction to form sulfated magnesium hydroxide cement. The molar ratio of magnesium oxide to magnesium sulfate in this reaction mixture may vary widely. Thus, sulfated magnesium hydroxide cement may be formed from mixtures in which this molar ratio is between about 3:1 to 33:1. As soon as the magnesium oxide is mixed with the magnesium sulfate gauging solution, the resulting cement begins to set. However, at normal temperatures the setting takes about an hour. The reaction to form this sulfated magnesium hydroxide cement is exothermic. The cement is usually heated to about 150° to 180° F. so that the cement sets within a few minutes. If the magnesium oxysulfate cement of this invention is to be used as a binder for fibers or other materials, the sulfated magnesium hydroxide reaction product is applied to the desired material before the cement has set and before being subjected to steam vapors. In this manner, the magnesium oxysulfate cement is formed in situ.

As discussed hereinabove, after formation of the sulfated magnesium hydroxide, this product is subjected to steam vapors to convert it to magnesium oxysulfate. The oxysulfate formed in this manner has been identified by X-ray and infrared analysis as being primarily of the $5Mg(OH)_2$—$MgSO_4$—$3H_2O$ form. Either atmospheric steam or steam under pressure may be used to form the oxysulfate. It is generally preferred. however, to use steam under pressure in the conversion, for the use of such pressurized steam converts a greater percentage of the sulfated magnesium hydroxide to the oxysulfate than does the use of atmospheric steam. Furthermore, the time required to convert the sulfated magnesium hydroxide to oxysulfate is much less when pressurized steam is used. Excellent results have been obtained by subjecting the sulfated magnesium hydroxide to steam at a pressure of between about 15 and 150 p.s.i. Other steam pressures may, of course, also be used.

Figure 4:
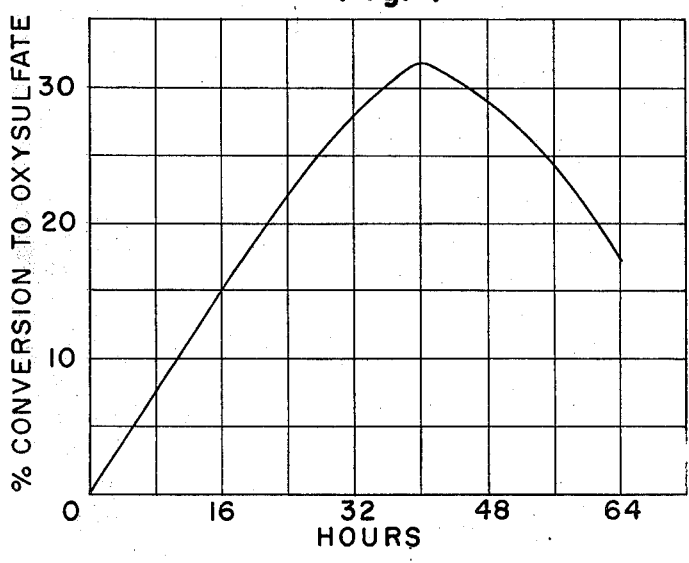
FIGURE 4 is a graph showing the percent of sulfated magnesium hydroxide converted to magnesium oxysulfate when subjected to atmospheric steam according to this invention.

It has been found that the amount of oxysulfate formed according to the present invention, passes through a maximum value during the steaming cycle. This phenomenon occurs when the sulfated magnesium hydroxide is exposed to both atmospheric steam and steam under pressure. However, this maximum value is much greater and occurs more rapidly when the sulfated magnesium hydroxide is exposed to pressurized steam than when exposed to atmospheric steam, as is shown in FIGURES 1 and 4. Thus, FIGURE 1 shows the percent of sulfated magnesium hydroxide converted to magnesium oxysulfate when subjected to pressurized steam in an autoclave, and FIGURE 4 shows the percent converted when exposed to atmospheric steam. According to FIGURE 1, the maximum amount of the oxysulfate is formed by subjecting the sulfated magnesium hydroxide to pressurized steam for between 4 and 16 hours. According to FIGURE 4, when subjected to atmospheric steam, the maximum amount of oxysulfate is formed between about 20 and 60 hours. It should also be noted that the amount of oxysulfate formed during the 4 to 16 hour exposure to pressurized steam is about twice that formed during the 20 to 60 hour exposure to atmospheric steam.

Figure 2:
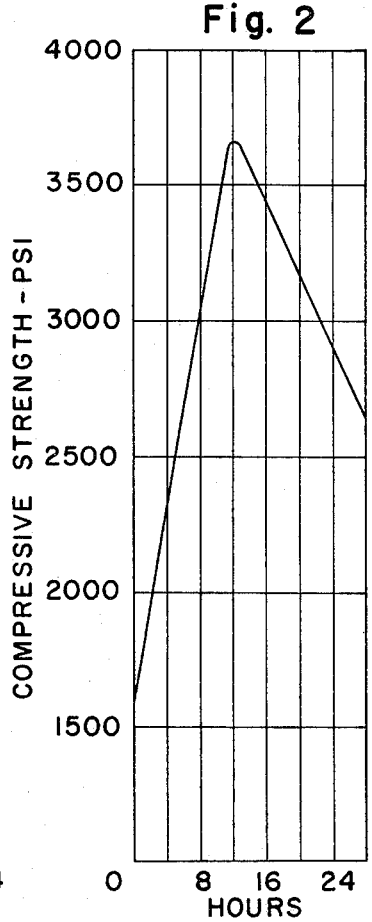
FIGURE 2 is a graph showing the change in compressive strength when sulfated magnesium hydroxide is exposed to steam under pressure.

As discussed hereinabove, the strength of magnesium oxysulfate cement formed according to the present invention is significantly greater than the sulfated magnesium hydroxide cement used heretofore. This is clearly evident from FIGURE 2, which shows the compressive strength of oxysulfate cement which has been formed by subjecting sulfated magnesium hydroxide to pressurized steam. A comparison of FIGURES 1 and 2 shows that the compressive strength of the cement closely follows the percent of oxysulfate in the cement, and that the strength of the cement which has been exposed to pressurized steam for between 4 and 20 hours is significantly greater than the sulfated magnesium hydroxide cement (0 hours on the graph).

Figure 3:
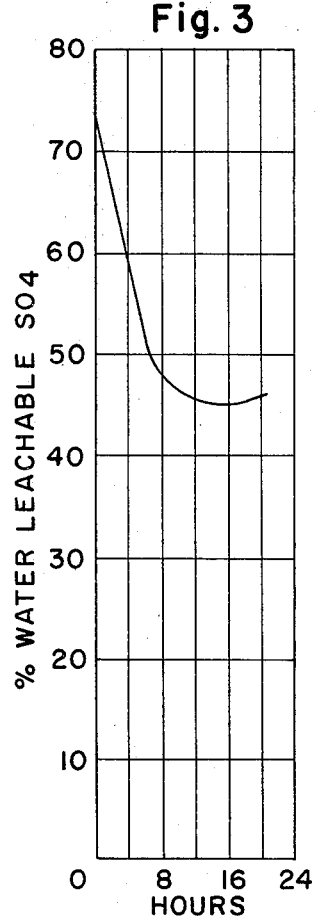
FIGURE 3 is a graph showing the change in water leachable sulfate content when sulfated magnesium hydroxide is exposed to steam under pressure.

Also, as discussed hereinabove, sulfated magnesium hydroxide cement suffers from a drastic reduction in strength when exposed to water, this deterioration being due to the leaching and/or dissolving of sulfate ions from the cement. Thus, sulfated magnesium hydroxide cement is subject to a reduction in strength of up to 90% upon exposure to water. The wet strength of the magnesium oxysulfate cement of the present invention is significantly greater than that of the previously used sulfated magnesium hydroxide cement, for the amount of sulfate, in the oxysulfate cement of this invention, which is water leachable is reduced to less than one-half of the amount present in cement where no oxysulfate occurs. This is shown in FIGURE 3 which shows the drastic reduction in the amount of water leachable sulfate in the cement of the present invention (4 to 20 hours) as compared to sulfated magnesium hydroxide cement (0 hours).

EXAMPLE I

The data for FIGURES 2 and 3 were provided in the following manner. A slurry containing 806 grams of finely divided MgO, 986 grams of $MgSO_4$—$7H_2O$ crystals and 4540 grams of periclase filler was made by adding the MgO to a gauging solution of $MgSO_4$—$7H_2O$ and then stirring in the periclase. Sufficient water was added to make a paste. This cementitious paste was then charged into molds 3" x 3" x 3" and allowed to set overnight. The resulting cubes consisted of 72.7% periclase and 28.3% sulfated magnesium hydroxide binder. Three of the cubes were not treated further. The remainder of the cubes were introduced into an autoclave at a pressure of 15 p.s.i. and a temperature of 250° F. Three cubes were then removed from the autoclave at four hour intervals, until the last set was removed after 28 hours. The cubes were then tested according to a standard procedure to determine compressive strength, and the values obtained plotted in FIGURE 2. The results show that the compressive strength increases markedly upon exposure to pressurized steam to a maximum value between about 8 and 16 hours, and then declines somewhat. Subsequently, the $SO_4$ content of the cubes and the water leachable $SO_4$ content of the cubes were determined by a standard procedure. The percent of the total $SO_4$ content which was water leachable was then determined from these values, and the results plotted in FIGURE 3. The results show that the present of water leachable sulfate decreases markedly upon autoclaving to a minimum value after about 8 to 16 hours of exposure to the pressurized steam.

EXAMPLE II

Another set of sulfated magnesium hydroxide cement bonded periclase cubes was prepared in the manner described hereinabove, the cement having a $MgO:MgSO_4$ molar ratio of 5:1. One group of these cubes was subjected to pressured steam by autoclaving, as described in Example I, with the cubes being removed from the autoclave at four hour intervals. Another group of the cubes was subjected to atmospheric steam by placing the cubes in a steam chest at a temperature of about 210° F. One set of the cubes was removed from the chest at each four hour interval until the last set was removed after 64 hours. The percent of sulfated magnesium hydroxide binder in the cubes which was converted to magnesium oxysulfate was determined by X-ray and infrared methods of analysis. The values obtained for the autoclaved samples were plotted in FIGURE 1, and the results for the atmospheric steam plotted in FIGURE 4. The results show that both methods of steaming produced an increase in the oxysulfate content to a maximum value, after which the oxysulfate content decreased. As is evident from the figures, the maximum oxysulfate value was higher for the autoclaved samples, and the autoclaved samples reached the maximum oxysulfate content in a much shorter period of time than the samples which were subject to atmospheric steam.

The magnesium oxysulfate cement of the present invention may be used as a binder in a number of products such as boards, panels, title, shingles and the like formed of fibrous materials such as, for example, asbestos fibers, cellulose fibers, glass fibers, mineral fibers, and the like. In forming such products, the fibers are coated with the sulfated magnesium hydroxide cement before it has set, and the cement coated fibers then formed into a sheet or mat of any desired thickness, density, shape, etc. The cement is then allowed to set, thereby forming a mat of fibers bonded together by the sulfated magnesium hydroxide cement. The cement bonded fibrous sheet is then subjected to steam vapor according to the present invention to convert the sulfated magnesium hydroxide cement to magnesium oxysulfate cement.

It will be understood that this invention is capable of further modification, and this application is intended to cover any variations, uses or adaptations of the invention which are within the scope of the appended claims.

We claim:

1. A method of forming magnesium oxysulfate which comprises
    forming sulfated magnesium hydroxide by reacting magnesium oxide with a dilute aqueous solution of magnesium sulfate, and
    subjecting the sulfated magnesium hydroxide to steam for a period of between about 4 and about 60 hours whereby a substantial portion of said hydroxide is converted to magnesium oxysulfate of the $5Mg(OH)_2—MgSO_4—3H_2O$ form.

2. A method as defined in claim 1 in which said sulfated magnesium hydroxide is subjected to steam under pressure, the hydroxide being subjected to said steam for a period of between about 4 and 20 hours.

3. A method as defined in claim 1 in which the sulfated magnesium hydroxide is subjected to atmospheric steam for a period of between about 20 and 60 hours.

4. A method of forming a magnesium oxysulfate cement bonded fibrous product which comprises
    reacting magnesium oxide with a dilute aqueous solution of magnesium sulfate to form a sulfated magnesium hydroxide cement,
    coating a fibrous material with said cement before the cement has set,
    allowing said cement to set, whereby the cement coating bonds the fibers together, and
    subjecting said cement bonded fibers to steam vapors for a period of between 4 and about 60 hours sufficient to convert a substantial portion of said sulfated magnesium hydroxide cement to magnesium oxysulfate cement said oxysulfate having the form $5Mg(OH)_2—MgSO_4—3H_2O$.

5. A method as defined in claim 4 in which the cement bonded fibers are subjected to steam under pressure, for a period of between about 4 and 20 hours.

6. A method as defined in claim 4 in which the cement bonded fibers are subjected to atmospheric steam for a period of between about 20 and 60 hours.

7. A magnesium oxysulfate cement-bonded fibrous sheet produced according to the method of claim 4.

References Cited

UNITED STATES PATENTS

| | | | |
|---|---|---|---|
| 2,944,291 | 7/1960 | Prior et al. | 264—82 |
| 1,446,213 | 2/1923 | Roucha | 264—82 |

TOBIAS E. LEVOW, Primary Examiner

W. T. SCOTT, Assistant Examiner

U.S. Cl. X.R.

264—82; 156—39; 23—128, 203